United States Patent
Clum et al.

(10) Patent No.: US 10,422,229 B2
(45) Date of Patent: Sep. 24, 2019

(54) AIRFOIL COOLING

(71) Applicant: UNITED TECHNOLOGIES CORPORATION, Farmington, CT (US)

(72) Inventors: Carey Clum, East Hartford, CT (US); Mark F. Zelesky, Bolton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 290 days.

(21) Appl. No.: 15/465,262

(22) Filed: Mar. 21, 2017

(65) Prior Publication Data
US 2018/0274369 A1 Sep. 27, 2018

(51) Int. Cl.
*F01D 5/18* (2006.01)
*F01D 5/14* (2006.01)
*F02C 3/04* (2006.01)

(52) U.S. Cl.
CPC .............. *F01D 5/18* (2013.01); *F01D 5/147* (2013.01); *F01D 5/187* (2013.01); *F02C 3/04* (2013.01); *F05D 2220/32* (2013.01); *F05D 2240/121* (2013.01); *F05D 2240/301* (2013.01); *F05D 2240/303* (2013.01); *F05D 2240/35* (2013.01); *F05D 2260/221* (2013.01);
(Continued)

(58) Field of Classification Search
CPC . F01D 5/187; F01D 5/18; F01D 5/147; F05D 2260/204; F05D 2260/2214; F05D 2260/22141; F05D 2260/2212; F05D 2260/221; F05D 2260/84; F05D 2240/121; F05D 2240/301; F05D 2240/303; F05D 2240/35; Y02T 50/672; Y02T 50/676; F02C 3/04
See application file for complete search history.

(56) References Cited

U.S. PATENT DOCUMENTS 4,111,600 A * 9/1978 Rothman ................ F01D 5/147
416/2
4,505,639 A 3/1985 Groess et al.
(Continued)

FOREIGN PATENT DOCUMENTS

| WO | 2011/161357 | 12/2011 |
| WO | 2016133487 | 8/2016 |

OTHER PUBLICATIONS

European Patent Office, European Search Report dated Aug. 2, 2018 in Application No. 18161155.9.

*Primary Examiner* — Philip E Stimpert
(74) *Attorney, Agent, or Firm* — Snell & Wilmer, L.L.P.

(57) ABSTRACT

An airfoil may include an external airfoil surface and an airfoil body. The airfoil body may include an external wall structure and an internal wall structure. The external airfoil surface may be adjacent the external wall structure. The airfoil body may define a skin core that is at least partially defined by a first section of the external wall structure and a first section of the internal wall structure. The airfoil body may also define an embedded core that is at least partially defined by the first section of the internal wall structure. An embedded core heat transfer augmentation feature may be formed within the embedded core on an embedded core surface of the first section of the internal wall structure.

17 Claims, 3 Drawing Sheets

(52) U.S. Cl.
  CPC ... *F05D 2260/22141* (2013.01); *Y02T 50/672* (2013.01); *Y02T 50/676* (2013.01)

(56) References Cited

U.S. PATENT DOCUMENTS

| | | | | |
|---|---|---|---|---|
| 6,533,547 | B2* | 3/2003 | Anding | F01D 5/188 |
| | | | | 416/241 R |
| 7,857,589 | B1* | 12/2010 | Liang | F01D 5/187 |
| | | | | 416/97 R |
| 2002/0025248 | A1* | 2/2002 | Lee | B23H 9/00 |
| | | | | 415/1 |
| 2005/0084370 | A1* | 4/2005 | Gross | F01D 5/187 |
| | | | | 416/95 |
| 2006/0056967 | A1* | 3/2006 | Liang | F01D 5/186 |
| | | | | 416/97 R |
| 2015/0152737 | A1 | 6/2015 | Liang | |
| 2016/0208622 | A1* | 7/2016 | Ahmad | F01D 5/187 |
| 2016/0312622 | A1* | 10/2016 | Burbaum | F01D 5/187 |

* cited by examiner

AIRFOIL COOLING

FIELD

The present disclosure relates to gas turbine engines, and more specifically, to airfoils in gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Temperatures within the turbine section may be relatively high, as the flow of fluid is received initially from the combustor section of the gas turbine engine. Cooling air may be extracted from the compressor section and used to cool the gas path components. For exampling, cooling air from the compressor can be routed to provide internal convection cooling via internal cavities within airfoils. For various reasons, the leading edge of internally-cooled airfoils, such as turbine blades and vanes, may be particularly difficult to cool, especially if an external wall of the leading edge is punctured or otherwise impaired, for example by foreign object damage.

SUMMARY

In various embodiments, the present disclosure provides an airfoil comprising an external airfoil surface and an airfoil body. The airfoil body may include an external wall structure and an internal wall structure. The external airfoil surface may be adjacent the external wall structure. The airfoil body may define a skin core and an embedded core. The skin core may be at least partially defined by a first section of the external wall structure and a first section of the internal wall structure. The embedded core may be at least partially defined by the first section of the internal wall structure. In various embodiments, an embedded core heat transfer augmentation feature is formed within the embedded core on an embedded core surface of the first section of the internal wall structure.

In various embodiments, a skin core heat transfer augmentation feature is formed within the skin core on a skin core surface of the first section of the external wall structure. In various embodiments, the embedded core heat transfer augmentation feature is formed on the embedded core surface of the first section of the internal wall structure. In various embodiments, the embedded core heat transfer augmentation feature is disposed between the skin core and the embedded core.

In various embodiments, the skin core extends along at least a portion of a leading edge of the airfoil. The skin core may be a first skin core and the airfoil body may define a second skin core disposed adjacent the first skin core. The second skin core may be at least partially defined by a second section of the external wall structure and the first section of the internal wall structure. In various embodiments, the second skin core extends along at least a portion of a pressure side of the airfoil. In various embodiments, the airfoil body defines a third skin core disposed adjacent the first skin core. The third skin core may be at least partially defined by a third section of the external wall structure and the first section of the internal wall structure. The third skin core may extend along at least a portion of a suction side of the airfoil. In various embodiments, the first skin core, the second skin core, and the third skin core are disposed around the embedded core.

In various embodiments, the embedded core is entirely defined by the internal wall structure. In various embodiments, the external airfoil surface abuts the external wall structure. In various embodiments, the embedded core heat transfer augmentation feature comprises a plurality of embedded core heat transfer augmentation features. The embedded core heat transfer augmentation features may include an array of trip strips.

Also disclosed herein, according to various embodiments, is an airfoil that includes an external airfoil surface and an airfoil body. The airfoil body may include an external wall structure and an internal wall structure, wherein the external airfoil surface is adjacent the external wall structure. The airfoil body may define a first skin core at least partially defined by a first section of the external wall structure and a first section of the internal wall structure. In various embodiments, a skin core heat transfer augmentation feature is formed within the first skin core on a skin core surface of the first section of the external wall structure and the first skin core extends along at least a portion of a leading edge of the airfoil. The airfoil body may include a second skin core disposed adjacent the first skin core that may be at least partially defined by a second section of the external wall structure and the first section of the internal wall structure. The second skin core may extend along at least a portion of a pressure side of the airfoil. The airfoil body may include a third skin core disposed adjacent the first skin core that may be at least partially defined by a third section of the external wall structure and the first section of the internal wall structure. The third skin core may extend along at least a portion of a suction side of the airfoil. The airfoil body may include an embedded core that is at least partially defined by the first section of the internal wall structure. The embedded core heat transfer augmentation feature may be formed within the embedded core on an embedded core surface of the first section of the internal wall structure. In various embodiments, the embedded core is entirely defined by the internal wall structure.

Also disclosed herein, according to various embodiments, is a gas turbine engine that includes a compressor configured to rotate about an axis and compress a gas, a combustor aft of the compressor and configured to combust the gas, and a turbine section aft of the combustor and configured to extract energy from the combusted gas. The turbine section may include an airfoil configured to rotate about the axis. The airfoil may include an external airfoil surface and an airfoil body. The airfoil body may include an external wall structure and an internal wall structure, wherein the external airfoil surface may be adjacent the external wall structure. In various embodiments, the airfoil body defines a skin core at least partially defined by a first section of the external wall structure and a first section of the internal wall structure. The airfoil body may also define an embedded core that is at least partially defined by the first section of the internal wall structure. An embedded core heat transfer augmentation feature may be formed within the embedded core on an embedded core surface of the first section of the internal wall structure.

In various embodiments, a skin core heat transfer augmentation feature is formed within the skin core on a skin core surface of the first section of the external wall structure. In various embodiments, the embedded core heat transfer augmentation feature is disposed between the skin core and the embedded core.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
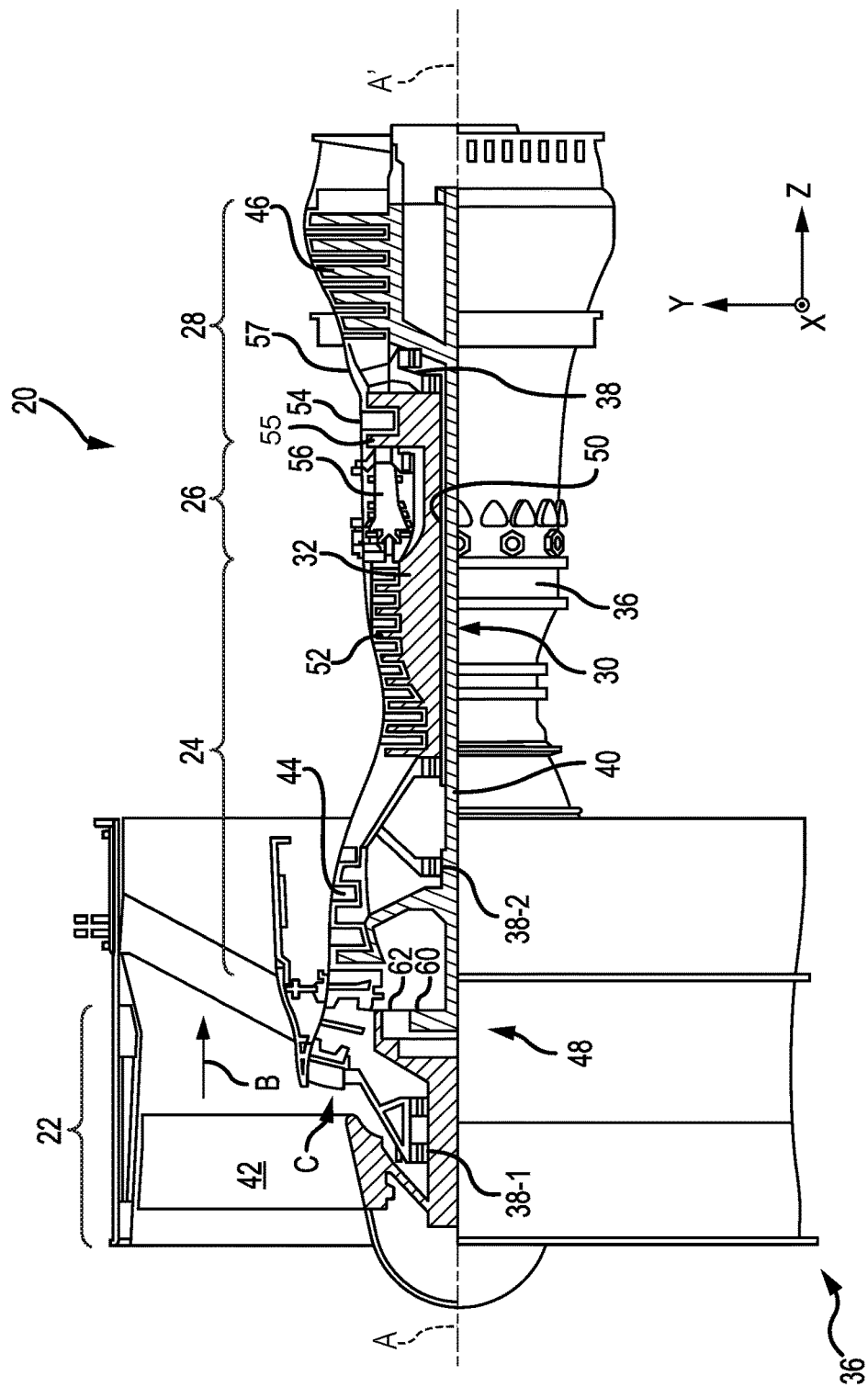
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Airfoil 55 (FIG. 1) may be an internally cooled component of the gas turbine engine 20. The internally cooled airfoil 55 may include internal cooling passages, as described in greater detail below. While internal cooling of airfoils is described extensively herein, the disclosure herein may be applied to various internally cooled engine components, such as blade outer air seals, airfoil platforms, combustor liners, blades, vanes, or any other suitable components.

Figure 2:
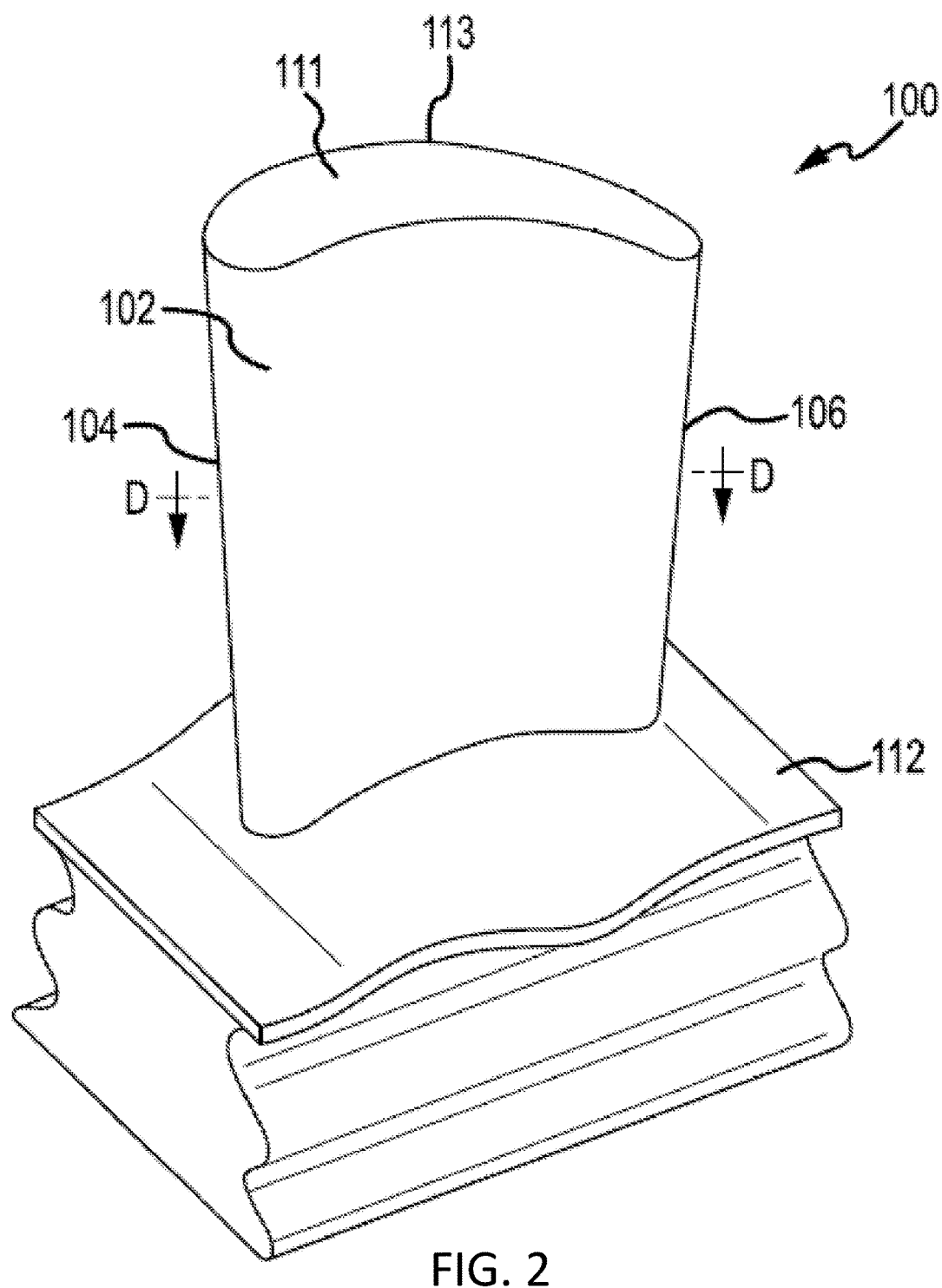
FIG. 2 illustrates a perspective view of an airfoil, in accordance with various embodiments.

With reference to FIG. 2, an airfoil 100 having a pressure side 102, a leading edge 104, and a trailing edge 106 is provided. Airfoil 100 also includes a tip 111, a base 112, and a suction side 113. It will be noted that airfoils for gas turbine engines may be provided in the variety of sizes, shapes and geometries. Accordingly, the airfoil of the present disclosure is not limited to the specific geometry, size, and shape shown in the figures.

Internal cooling passages may be oriented in various directions within the airfoil. A plurality of ribs may separate radial flow passages of the airfoil and may direct the cooling airflow through parallel and/or serpentine flow passages, to increase the efficiency of heat transfer between the airfoil walls and the cooling air. In various embodiments, the internal cooling passages are oriented generally in a direction extending from base 112 towards tip 111 (e.g., a radial direction when airfoil 100 is installed in a turbine). In various embodiments, and with reference to FIG. 3, the airfoil 100 includes multiple cooling passages or chambers. In various embodiments, the multiple cooling passages are interconnected. The cooling passages are referred to herein as "cores." For example, skin cores, as described in greater detail below, may be defined as cooling passages that are adjacent to the external airfoil surface 105 (FIG. 3).

Figure 3:
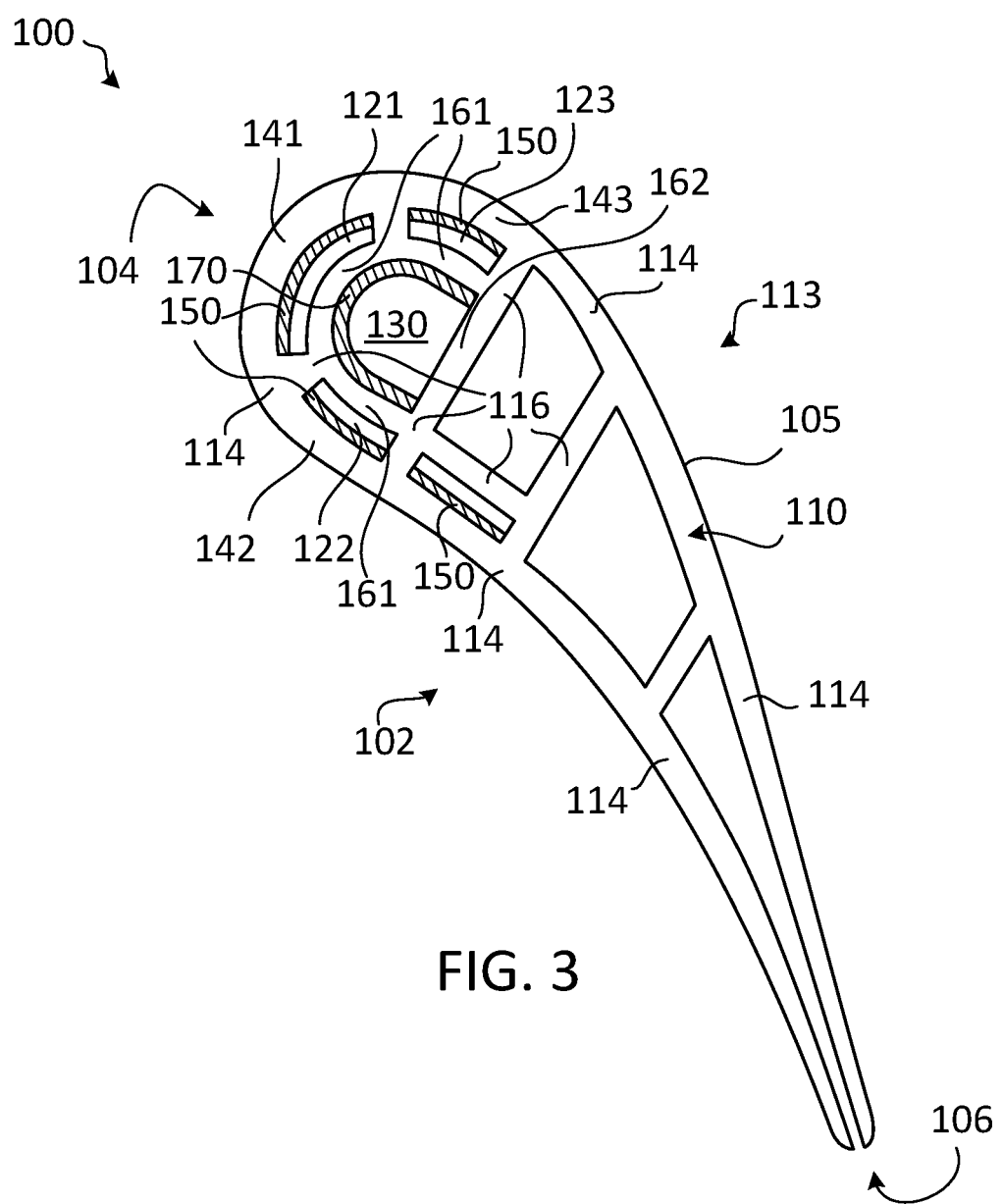
FIG. 3 illustrates a cross-sectional view of an airfoil, in accordance with various embodiments.

FIG. 3 shows a cross-sectional view of the airfoil 100, in accordance with various embodiments. In various embodiments, and with reference to FIG. 3, the airfoil 100 includes an external airfoil surface 105 and an airfoil body 110. The airfoil body 110 generally includes the structure, ribs, and/or walls that direct the cooling airflow through the airfoil 100 and thus the airfoil body 110 generally defines the various cores (i.e., cooling flow passages) within the airfoil 100. In various embodiments, the airfoil body 110 includes an external wall structure 114 and an internal wall structure 116. The external wall structure 114 generally includes the portions, segments, and/or sections of the airfoil body 110 that are adjacent to the external airfoil surface 105 while the internal wall structure 116 generally includes the portions, segments, and/or sections of the airfoil body 110 that are disposed within and extend between the external wall structure 114, according to various embodiments. Said differently, the external wall structure 114 may be referred to as hot-side walls and/or hot-side surfaces because the external wall structure 114 is adjacent to, and may directly abut, the external airfoil surface 105 and thus may be closer to the high temperature combustion gases passing over and around the airfoil 100. The internal wall structure 116 may be referred to as cool-side walls and/or cool-side surfaces because the internal wall structure 116 is nearer to the center of airfoil 100 than the external wall structure 114 and thus is further removed from the hot combustion gases.

In various embodiments, the airfoil body 110 defines a first skin core 121 and an embedded core 130. As used herein, the term "skin core" may refer to cores that are at least partially defined/formed by the external wall structure 114 and are thus generally disposed adjacent to (e.g., abutting) the external airfoil surface 105. Accordingly, the first skin core 121 is at least partially defined by a first section 141 of the external wall structure 114 and a first section 161 of the internal wall structure 116, according to various embodiments. The first skin core 121, according to various embodiments, is disposed to extend along at least a portion of the leading edge 104 of the airfoil 100.

The airfoil body 110 may include multiple skin cores, such as a second skin core 122 and a third skin core 123. In various embodiments, the skin cores 121, 122, 123 generally include skin core heat transfer augmentation features 150. The skin core heat transfer augmentation features 150 are configured to improve convective heat transfer and thus improve the cooling ability of the air flowing within the skin cores 121, 122, 123 to draw heat away from and thus cool the airfoil body 110 (e.g., the external wall structure 114). For example, as mentioned above, the first skin core 121 may be disposed to extend along the leading edge 104 of the airfoil 100, the second skin core 122 may be disposed adjacent the first skin core 121 and may extend along at least a portion of the pressure side 102 of the airfoil 100, and the third skin core 123 may be disposed adjacent the first skin core 121 and may extend along at least a portion of the suction side 113 of the airfoil 100.

The skin core heat transfer augmentation features 150 may include an array of trip strips, protrusions, dimples, recesses, turbulators, pin fins, pedestals, and other suitable cooling features. In various embodiments, the skin core heat transfer augmentation features 150 are disposed within respective skin cores 121, 122, 123 and are formed on respective skin core surfaces of respective sections 141, 142, 143 of the external wall structure 114. For example, the first skin core 121 may include skin core heat transfer augmentation features 150 disposed on the first section 141 of the external wall structure 114 of the airfoil body 110, the second skin core 122 may include skin core heat transfer augmentation features 150 disposed on a second section 142 of the external wall structure 114 of the airfoil body 110, and the third skin core 123 may include skin core heat transfer augmentation features 150 disposed on a third section 143 of the external wall structure 114 of the airfoil body 110.

In various embodiments, the embedded core 130 is defined by the first section 161 of the internal wall structure 116 and other internal sections, such as section 162, of the internal wall structure 116. Said differently, the embedded core 130 may be entirely defined by the internal wall structure 116 and thus may not be defined by the external wall structure 114. In various embodiments, skin cores 121, 122, 123 may be disposed around the embedded core 130. Accordingly, the sections 161, 162 of the internal wall structure 116 that define the embedded core 130 may be cool-side walls that are not adjacent the external airfoil surface 105 and thus do not interface with the hot combustion gases under nominal operating conditions. Accordingly, under nominal operating conditions the embedded core 130 would tend to not receive a large amount of heat per unit time from the surrounding walls 161, 162, according to various embodiments. However, in the event that the external wall structure 114 is punctured, ruptured, broken, cracked, damaged, or otherwise compromised (e.g., due to domestic or foreign object damage caused by liberated parts from upstream blade tip rubbing or wear and/or ingestion of particles and objects at the inlet of the engine, among others), the hot combustion gases may interface and interact with the sections 161, 162 of the internal wall structure 116 that define the embedded core 130. Accordingly, the airfoil 100 disclosed herein includes embedded core heat transfer augmentation features 170 disposed and formed within the embedded core 130 on an embedded core surface of at least one of the first section 161 of the internal wall structure 116 and other sections 162 of the internal wall structure 116. Said differently, the embedded core heat transfer augmentation features 170 may be disposed between the skin core(s) 121, 122, 123 and the embedded core 130 (e.g., within the embedded core 130). In various embodiments, the inclusion of the embedded core heat transfer augmentation features 170 within the embedded core 130 provides a level of heat transfer redundancy that allows the airfoil 100 to be properly cooled in the event of damage to the external wall structure 114 of the airfoil body 110 of the airfoil 100.

In various embodiments, the body 110 of the airfoil 100 and/or the various heat transfer augmentation features 150, 170 may be fabricated from a metallic material, such as a metal and/or a metal alloy. In various embodiments, for example, the body 110 of the airfoil 100 may be fabricated from nickel super alloys, cobalt super alloys, or other suitable metallic materials. In various embodiments, the body 110 of the airfoil 100 and/or the various heat transfer augmentation features 150, 170 may be fabricated from single crystal materials or ceramic matrix composite materials, among others.

In various embodiments, the body 110 of the airfoil having the various heat transfer augmentation features 150, 170 is made by forming one or more "core forms" and casting the airfoil body around the one or more core forms. The term "core form" may refer to a component or a shape that forms a negative mold of an internal cooling passage of an airfoil body. The core forms may be made using a core die technique, additive manufacturing technique, or a lost wax process, among other suitable processes. In various embodiments, the body 110 of the airfoil having the various heat transfer augmentation features 150, 170 is made by an additive manufacturing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil comprising:
an external airfoil surface;
an airfoil body comprising an external wall structure and an internal wall structure, wherein the external airfoil surface is adjacent the external wall structure, wherein the internal wall structure is disposed inward from the external wall structure relative to the external airfoil surface, wherein the airfoil body defines:
a skin core at least partially defined by a first section of the external wall structure and a first section of the internal wall structure; and
an embedded core entirely defined by the internal wall structure, wherein an embedded core heat transfer augmentation feature is formed within the embedded core on an embedded core surface of the first section of the internal wall structure.

2. The airfoil of claim 1, wherein a skin core heat transfer augmentation feature is formed within the skin core on a skin core surface of the first section of the external wall structure.

3. The airfoil of claim 1, wherein the embedded core heat transfer augmentation feature is disposed between the skin core and the embedded core.

4. The airfoil of claim 1, wherein the skin core extends along at least a portion of a leading edge of the airfoil.

5. The airfoil of claim 4, wherein the skin core is a first skin core, wherein the airfoil body defines a second skin core disposed adjacent the first skin core.

6. The airfoil of claim 5, wherein the second skin core is at least partially defined by a second section of the external wall structure and the first section of the internal wall structure.

7. The airfoil of claim 6, wherein the second skin core extends along at least a portion of a pressure side of the airfoil.

8. The airfoil of claim 6, wherein the airfoil body defines a third skin core disposed adjacent the first skin core, wherein the third skin core is at least partially defined by a third section of the external wall structure and the first section of the internal wall structure.

9. The airfoil of claim 8, wherein the third skin core extends along at least a portion of a suction side of the airfoil.

10. The airfoil of claim 8, wherein the first skin core, the second skin core, and the third skin core are disposed around the embedded core.

11. The airfoil of claim 1, wherein the external airfoil surface abuts the external wall structure.

12. The airfoil of claim 1, wherein the embedded core heat transfer augmentation feature comprises a plurality of embedded core heat transfer augmentation features.

13. The airfoil of claim 12, wherein the embedded core heat transfer augmentation features comprise an array of trip strips.

14. An airfoil comprising:
an external airfoil surface;
an airfoil body comprising an external wall structure and an internal wall structure, wherein the external airfoil surface is adjacent the external wall structure, wherein the internal wall structure is disposed inward from the external wall structure relative to the external airfoil surface, wherein the airfoil body defines:
a first skin core at least partially defined by a first section of the external wall structure and a first section of the internal wall structure, wherein a skin core heat transfer augmentation feature is formed within the first skin core on a skin core surface of the first section of the external wall structure, wherein the first skin core extends along at least a portion of a leading edge of the airfoil;
a second skin core disposed adjacent the first skin core, wherein the second skin core is at least partially defined by a second section of the external wall structure and the first section of the internal wall structure, wherein the second skin core extends along at least a portion of a pressure side of the airfoil;
a third skin core disposed adjacent the first skin core, wherein the third skin core is at least partially defined by a third section of the external wall structure and the first section of the internal wall structure, wherein the third skin core extends along at least a portion of a suction side of the airfoil; and
an embedded core entirely defined by the internal wall structure, wherein an embedded core heat transfer augmentation feature is formed within the embedded core on an embedded core surface of the first section of the internal wall structure.

15. A gas turbine engine, comprising:
a compressor configured to rotate about an axis and compress a gas;
a combustor aft of the compressor and configured to combust the gas;
a turbine section aft of the combustor and configured to extract energy from the combusted gas, wherein the turbine section comprises an airfoil configured to rotate about the axis, wherein the airfoil comprises an external airfoil surface and an airfoil body, wherein the airfoil body comprises an external wall structure and an internal wall structure, wherein the external airfoil surface is adjacent the external wall structure, wherein the internal wall structure is disposed inward from the external wall structure relative to the external airfoil surface, wherein the airfoil body defines:
a skin core at least partially defined by a first section of the external wall structure and a first section of the internal wall structure; and
an embedded core entirely defined the internal wall structure, wherein an embedded core heat transfer augmentation feature is formed within the embedded core on an embedded core surface of the first section of the internal wall structure.

16. The gas turbine engine of claim 15, wherein a skin core heat transfer augmentation feature is formed within the skin core on a skin core surface of the first section of the external wall structure.

17. The gas turbine engine of claim 16, wherein the embedded core heat transfer augmentation feature is disposed between the skin core and the embedded core.

* * * * *